United States Patent
Pribble et al.

(10) Patent No.: US 11,216,685 B2
(45) Date of Patent: *Jan. 4, 2022

(54) DYNAMICALLY OPTIMIZING PHOTO CAPTURE FOR MULTIPLE SUBJECTS

(71) Applicant: Capital One Services, LLC, McLean, VA (US)

(72) Inventors: Jason Pribble, McLean, VA (US); Daniel Alan Jarvis, Alexandria, VA (US); Nicholas Capurso, Tysons Corner, VA (US)

(73) Assignee: Capital One Services, LLC, McLean, VA (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/662,296

(22) Filed: Oct. 24, 2019

(65) Prior Publication Data

US 2020/0125882 A1    Apr. 23, 2020

Related U.S. Application Data

(63) Continuation of application No. 15/998,988, filed on Aug. 20, 2018, now Pat. No. 10,460,191.

(51) Int. Cl.
G06K 9/32 (2006.01)
H04N 1/387 (2006.01)
H04N 1/38 (2006.01)

(52) U.S. Cl.
CPC .............. *G06K 9/3283* (2013.01); *H04N 1/38* (2013.01); *H04N 1/387* (2013.01)

(58) Field of Classification Search
None
See application file for complete search history.

(56) References Cited

U.S. PATENT DOCUMENTS

| | | |
|---|---|---|
| 6,360,026 B1 | 3/2002 | Kulkarni et al. |
| 6,430,320 B1 | 8/2002 | Jia et al. |
| 6,956,587 B1 | 10/2005 | Anson et al. |
| 8,855,375 B2 | 10/2014 | Macciola et al. |
| 9,672,510 B2 | 6/2017 | Roach et al. |

(Continued)

FOREIGN PATENT DOCUMENTS

CN    106228168 A    12/2016

OTHER PUBLICATIONS

A Few Scanning Tips, 2001, 5 pages. Retrieved from Internet:[URL:https://www.scantips.com/basics3e.html].

(Continued)

*Primary Examiner* — Randolph I Chu
(74) *Attorney, Agent, or Firm* — Harrity & Harrity, LLP

(57) ABSTRACT

A user device detects, in a field of view of the camera, a first side of a document, and determines first information associated with the first side of the document. The user device selects a first image resolution based on the first information and captures, by the camera, a first image of the first side of the document according to the first image resolution. The user device detects, in the field of view of the camera, a second side of the document, and determines second information associated with the second side of the document. The user device selects a second image resolution based on the second information, and captures, by the camera, a second image of the second side of the document according to the second image resolution. The user device performs an action related to the first image and the second image.

20 Claims, 9 Drawing Sheets

(56) References Cited

U.S. PATENT DOCUMENTS

| | | |
|---|---|---|
| 10,460,191 B1 | 10/2019 | Pribble et al. |
| 2015/0262347 A1 | 9/2015 | Duerksen et al. |
| 2016/0104022 A1 | 4/2016 | Negro et al. |
| 2016/0124249 A1 | 5/2016 | Haddadi et al. |
| 2017/0332950 A1 | 11/2017 | Yu et al. |
| 2018/0063359 A1 | 3/2018 | Netsu et al. |

OTHER PUBLICATIONS

Canon MX390 series Manual, 2013, 8 pages.
Capturepoint, 2017, 5 pages. Retrieved from Internet:[URL:https://www.ademero.com/document-scanning-software/].
Kodak ScanMate i920 Scanner Scanning Setup Guide for TWAIN Applications, 2011, 44 pages.
Maclife., "How to Scan Images with Preview," 2012, 10 pages. Retrieved from Internet:[URL:https://www.techradar.com/how-to/computing/apple/how-to-scan-images-with-preview-1305691].
Scan Shell Store., "MediScan," Mar. 2007, 5 pages. Retrieved from Internet:[URL:http://www.scanshell-store.com/read_insurance_cards.htm].
Sharp MX-M365N Manual, 2014, 3 pages.
Tips for Scanning Documents and Images, https://meetingtomorrow.com/content-library/tips-for-scanning-documents-and-images, 2015, 5 pages.

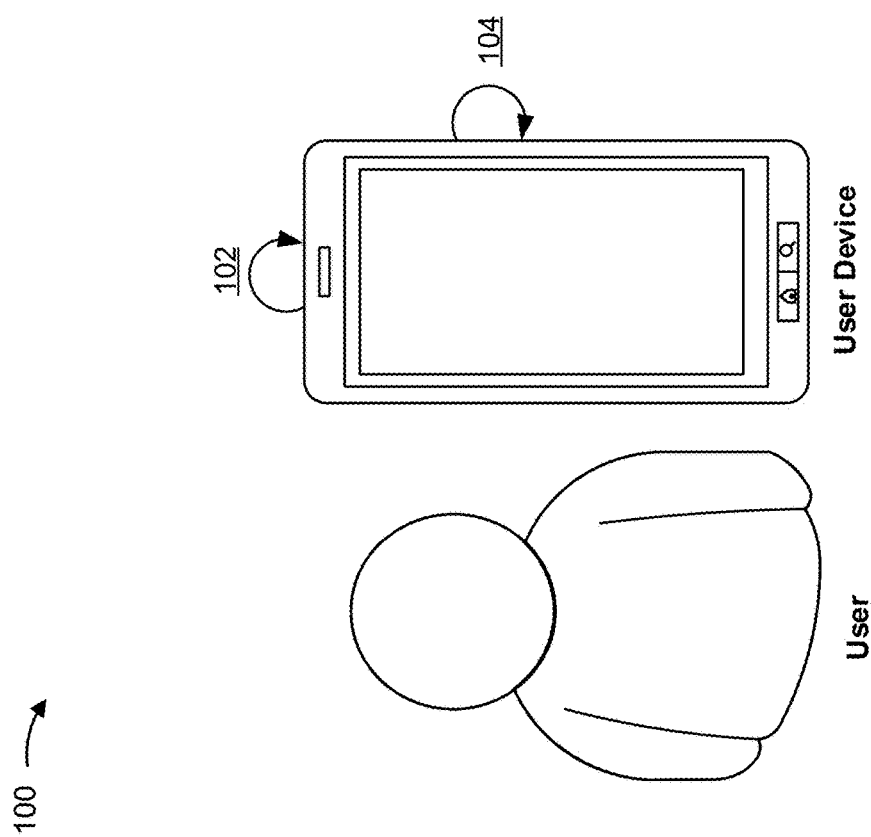

DYNAMICALLY OPTIMIZING PHOTO CAPTURE FOR MULTIPLE SUBJECTS

RELATED APPLICATION

This application is a continuation of U.S. patent application Ser. No. 15/998,988, filed Aug. 20, 2018 (now U.S. Pat. No. 10,460,191), which is incorporated herein by reference.

BACKGROUND

A digital image has an associated image resolution, which defines the amount of detail in the image. An image resolution may be represented as a number of pixel columns (width) and a number of pixel rows (height).

SUMMARY

According to some implementations, a method may include determining, by a user device, a plurality of image resolutions supported by a camera of the user device. The method may include detecting, by the user device and in a field of view of the camera, a first side of a document, and determining, by the user device, first information associated with the first side of the document. The method may include selecting, by the user device and based on the first information, a first image resolution of the plurality of image resolutions, and capturing, by the camera of the user device, a first image of the first side of the document according to the first image resolution. The method may include detecting, by the user device and in the field of view of the camera, a second side of the document, and determining, by the user device, second information associated with the second side of the document. The method may include selecting, by the user device and based on the second information, a second image resolution of the plurality of image resolutions, wherein the second image resolution corresponds to a different quality of image than the first image resolution. The method may include capturing, by the camera of the user device, a second image of the second side of the document according to the second image resolution. The method may include performing, by the user device, an action related to the first image and the second image.

According to some implementations, a user device may include one or more memories, and one or more processors, communicatively coupled to the one or more memories, to determine a plurality of image resolutions supported by a camera of the user device, and to determine a screen aspect ratio of a display of the user device. The one or more processors may detect, in a field of view of the camera, a first side of a document, and may determine first information associated with the first side of the document. The one or more processors may select, based on the first information and the screen aspect ratio, a first image resolution of the plurality of image resolutions, and may capture, by the camera of the user device, a first image of the first side of the document according to the first image resolution. The one or more processors may detect, in the field of view of the camera, a second side of the document, and may determine second information associated with the second side of the document. The one or more processors may select, based on the second information and the screen aspect ratio, a second image resolution of the plurality of image resolutions, wherein the second image resolution is a different level of resolution than the first image resolution, and may capture, by the camera of the user device, a second image of the second side of the document according to the second image resolution. The one or more processors may perform an action related to the first image and the second image According to some implementations, a non-transitory computer-readable medium may store instructions that include one or more instructions that, when executed by one or more processors of a user device, cause the one or more processors to determine a plurality of image resolutions supported by a camera of the user device, and to detect, in a field of view of the camera, a first side of a document. The one or more instructions may cause the one or more processors to determine first information associated with the first side of the document, and to select, based on the first information, a first image resolution of the plurality of image resolutions. The one or more instructions may cause the one or more processors to cause the display of the user device to present first preview images of the first side of the document, and to capture, by the camera of the user device, a first image of the first side of the document according to the first image resolution. The one or more instructions may cause the one or more processors to detect, in the field of view of the camera, a second side of the document, and to determine second information associated with the second side of the document. The one or more instructions may cause the one or more processors to select, based on the second information, a second image resolution of the plurality of image resolutions, wherein the second image resolution is the same as the first image resolution. The one or more instructions may cause the one or more processors to cause the display of the user device to present second preview images of the second side of the document. The one or more instructions may cause the one or more processors to capture, by the camera of the user device, a second image of the second side of the document according to the second image resolution. The one or more instructions may cause the one or more processors to perform an action related to the first image and the second image.

BRIEF DESCRIPTION OF THE DRAWINGS

FIGS. 1A-1D are diagrams of example implementations described herein.

DETAILED DESCRIPTION

Figure 1B:
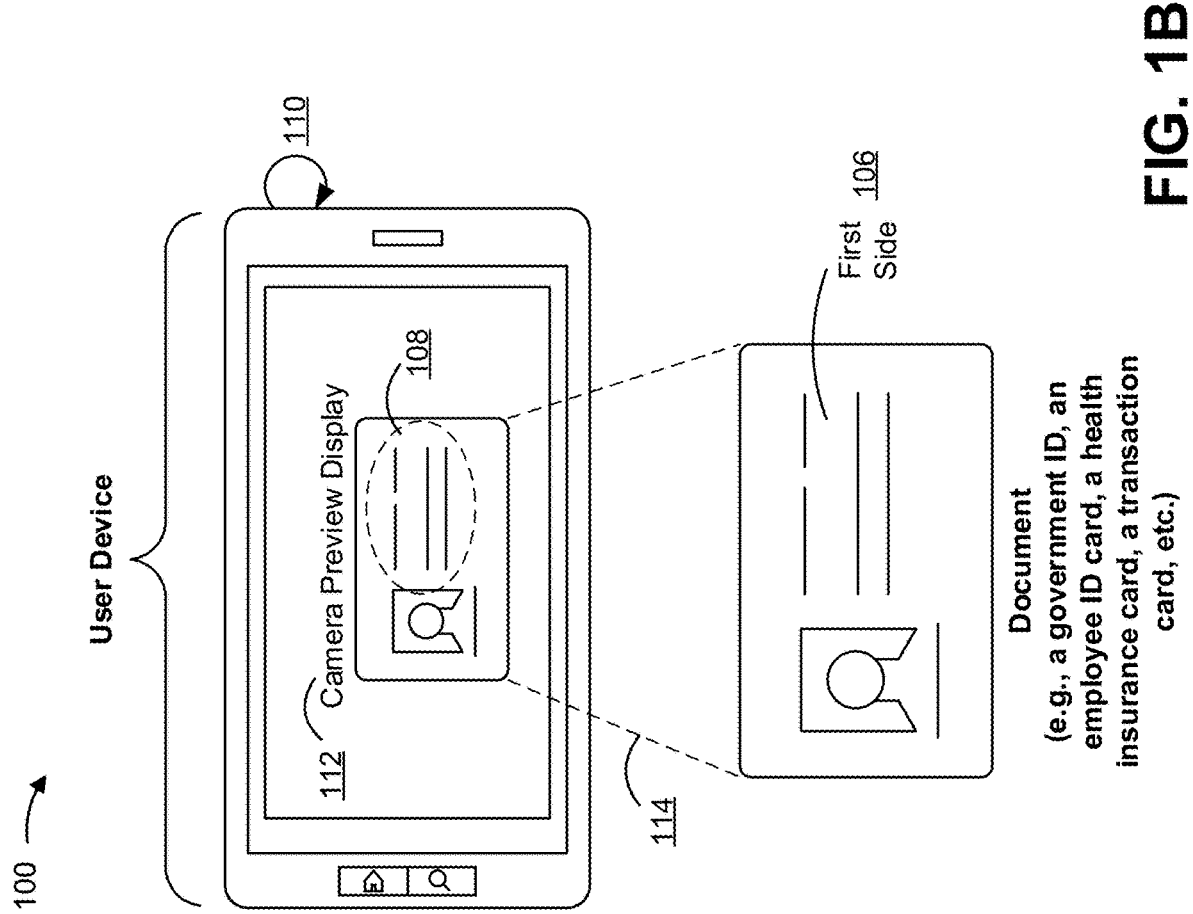

The following detailed description of example implementations refers to the accompanying drawings. The same reference numbers in different drawings may identify the same or similar elements.

Some entities (e.g., financial institutions, such as banks and/or the like) permit account applicants, or customers, to capture images of verification documentation (e.g., government-issued identification (ID) cards and/or the like) using a user device (e.g., a smartphone), and submit the images over the Internet for validation. However, this can often be a frustrating process for a user, particularly if an entity's backend platform repeatedly rejects uploaded images for not meeting certain image quality standards. Furthermore, the amount of time required for a user device to capture an image, upload the image to a server, and process the image increases as resolution of the image increases. The image's file size also increases as the image resolution increases, which results in transmission of more data than may be needed over a network.

Some implementations, described herein, provide a user device that is able to automatically select an optimal image resolution for capturing an image of a side of a document such that the image resolution is a high enough resolution to meet certain image quality standards and the image resolution is a low enough resolution to minimize image file size. In some implementations, the user device may detect a first side of a document in a field of view of a camera of the user device and determine first information associated with the first side of the document. In some implementations, the user device may select a first image resolution, based on the first information, for capturing a first image of the first side of the document, and capture the first image according to the first image resolution. In some implementations, the user device may detect a second side of a document in the field of view of the camera of the user device and determine second information associated with the second side of the document. In some implementations, the user device may select a second image resolution, based on the second information, for capturing a second image of the second side of the document, and capture the second image according to the second image resolution. In some implementations, the first image resolution is different than the second image resolution. In some implementations, the first image resolution is the same resolution as the second image resolution.

In this way, the user device optimizes image capture for multiple subjects (e.g., a first side of a document and a second side of a document). In this way, the user device ensures that that first image resolution for capturing the first image is a high enough resolution (e.g., a first optimal resolution) for the user device and/or a server to process the first image, and that the second image resolution for capturing the second image is a high enough resolution (e.g., a second optimal resolution) for the user device and/or the server to process the second image. Moreover, the first image resolution and the second image resolution are chosen based on the document and/or subject so as to limit computing resources needed to capture, upload, and process the first and second image. For example, by optimally choosing image resolutions on a document/subject basis, the user device minimizes the file size of the first image (e.g., a first optimal file size) and the file size of the second image (e.g., a second optimal file size), which shortens the amount of time to capture, upload, and process the first image and the second image. This conserves computing resources, power resources, and memory resources of the user device that would otherwise need to be expended in cases where images are captured with a default resolution. In addition, this conserves computing resources, memory resources, and network resources, associated with a backend platform, such as a server, that would otherwise need to be expended to receive and process images with a large file size.

FIGS. 1A-1D are diagrams of example implementations 100 described herein. Example implementation 100 may include a user device (e.g., a mobile device, such as a smartphone and/or the like) and a document (e.g., a government-issued identification (ID) card, an employee identification card, a health insurance card, a transaction card (e.g., a credit card, a debit card, an automated teller machine (ATM) card, and/or the like), a check, and/or the like). In some implementations, the user device may include a camera (e.g., one or more cameras) configured to capture images, and one or more applications (e.g., provided by, or associated with, an entity, such as a financial institution (e.g., a bank and/or the like)) capable of facilitating image capturing. In some implementations, the user may execute the one or more applications on the user device to capture a first image of a first side of the document and/or capture a second image of a second side of the document.

As shown in FIG. 1A, and by reference number 102, the user device (e.g., via an application executing on the user device) determines a plurality of image resolutions that are supported by the camera of the user device. In some implementations, the camera may support one or more image resolutions. In some implementations, an image resolution may be represented as a number of pixel columns (width) and a number of pixel rows (height), such as 1280×720, 1920×1080, 2592×1458, 3840×2160, 4128×2322, 5248×2952, 5312×2988, and/or the like, where higher numbers of pixel columns and higher numbers of pixel rows are associated with higher image resolutions. In some implementations, the camera may support a first image resolution that is associated with a quick capture mode, such as a low image resolution for capturing and displaying low-detail preview images on a display of the user device. In some implementations, the camera may support a second image resolution that is associated with a full capture mode, such as a high image resolution for capturing a high-detail image. In some implementations, the full capture mode may be associated with the highest image resolution supported by the camera.

As shown by reference number 104, the user device (e.g., via an application executing on the user device) may determine a screen aspect ratio of a display of the user device. In some implementations, the screen aspect ratio of the display may be represented as a proportional relationship between a width of the display and a height of the display, such as 4:3, 5:4, 3:2, 16:10, 16:9, 18:9, 21:9, 32:9, and/or the like. In some implementations, a screen aspect ratio may be associated with one or more image resolutions, such that an image with the one or more image resolutions fits the display with the screen aspect ratio with minimal scaling, letterboxing, and/or pillarboxing.

As shown in FIG. 1B and by reference number 106, the user device (e.g., via an application executing on the user device) may detect a first side of a document. In some implementations, the one or more applications may instruct the user to position the user device over the document for the user device to detect the first side of the document. In some implementations, the user may point the camera of the user device at the first side of the document and the user device may detect the first side of the document in a field of view of the camera. In some implementations, the camera of the user device may capture first preview images of the first side of the document and process the first preview images to detect the first side of the document. In some implementations, the user device may capture the first preview images using the quick capture mode.

In some implementations, the user device may employ one or more computer vision techniques (e.g., a scale-invariant feature transform (SIFT) technique, a speeded up robust features (SURF) technique, a generalized robust invariant feature (G-RIF) technique, and/or the like) to process the first preview images to detect the first side of the document and/or features of the first side of the document. In some implementations, the user device may detect a plurality of edges in a first preview image that are associated with the first side of the document, such as edges concerning text, images, objects, boundaries, and/or the like. For example, the user device may detect, in the first preview image, edges associated with an image of a state seal on a front side of a state-issued driver's license ID card. In some implementations, the user device may detect text in the first preview image that is associated with the first side of the document. For example, the user device may detect, in the first preview image, text associated with a name, an address, a birth date, and/or the like on the front side of the state-issued driver's license ID card. In some implementations, the user device may detect a bar code, a quick response (QR) code, an identification string, and/or the like in the first preview image that is associated with the first side of the document. For example, the user device may detect, in the first preview image, an identification number on the front side of the state-issued driver's license ID card.

As shown by reference number 108, the user device (e.g., via an application executing on the user device) may determine first information associated with the first side of the document. In some implementations, the first information may include information regarding content of the first side of the document, information regarding identification of the first side of the document, lighting information concerning the first side of the document, and/or the like. In some implementations, the user may enter the first information into the user device through a user interface of the user device. For example, the user device may receive information identifying the first side of the document as the front side of a transaction card from the user via the user interface of the user device. In some implementations, image capture associated with a document type may be triggered by the application or by a user interaction with the application, such that the application may predetermine a document type and/or side of a document.

In some implementations, the user device may determine the first information based on detecting the first side of the document. In some implementations, the user device may process the plurality of edges, the text, the bar code, the QR code, the identification string, and/or the like that may be associated with the first side of the document and that were detected by the user device when detecting the first side of the document to determine the first information. For example, the user device may process the text associated with the front side of the transaction card to determine a customer name, an issuing bank name, and an account number associated with the transaction card.

In some implementations, the user device may determine the first information by comparing information regarding the first side of the document that the user enters into the user device (e.g., input data) and information regarding the first side of the document that the user device determines based on detecting the first side of the document (e.g., image data). For example, the user may enter input data concerning a customer name, an issuing bank name, and/or an account number associated with the front side of a document into the user device. The user device may determine image data concerning a customer name, an issuing bank name, and/or an account number associated with the front side of the document based on detecting the front side of the transaction card. The user device may compare the input data customer name and the image data customer name, may compare the input data issuing bank name and the image data issuing bank name, may compare the input data account number and the image data account number, and/or the like, to determine that input data and image data are consistent and that both the input data and the image data indicate that the first side of the document is a front side of a transaction card.

As shown by reference number 110, the user device (e.g., via an application executing on the user device) may select a first image resolution for capturing a first image of the first side of the document. In some implementations, the user device may select the first image resolution from the plurality of image resolutions based on the first information. For example, where the first information indicates that the first side of the document is the front side of a check, the user device may select the first image resolution that will provide enough detail in the first image for the user device, a server device, and/or the like to determine and/or validate the content of the front side of the check. Moreover, the user device may select the first image resolution to provide sufficient detail, but no more (or not needlessly more) detail than is preferred by the user device and/or the server device, thereby reducing the first image file size, which reduces the amount of time, computing resources, power resources, and/or memory resources of the user device and/or the server device needed to capture, upload, and process the first image. In some implementations, the first image resolution is an optimal resolution, which provides sufficient detail to process and/or validate an image of the first side of the document while minimizing the size of the image file.

In some implementations, the user device may use a lookup table to select the first image resolution. For example, the user device may search the lookup table based on the first information to select the first image resolution. In some implementations, the lookup table may include a first preferred image resolution for a first side of a document type and a second preferred image resolution for a second side of the document type. For example, the lookup table may include a first preferred image resolution for a front side of a government-issued ID card and a second preferred image resolution for a back side of the government-issued ID card. In some implementations, the first preferred image resolution is a lower resolution than the second preferred image resolution. In some implementations, the first preferred image resolution is a higher resolution than the second preferred image resolution. In some implementations, the first preferred image resolution is the same resolution as the second preferred image resolution.

In some implementations, the user device (e.g., via an application executing on the user device) may select the first image resolution based on the first information and the screen aspect ratio. In some implementations, the user device may determine, based on the screen aspect ratio, a set of optimal image resolutions of the plurality of image resolutions that correspond to dimensions of the display of the user device. For example, the user device may evaluate each image resolution of the plurality of image resolutions to determine, for an image resolution, whether the image resolution fits the display of the user device. The user device may determine that the image resolution fits the display if an image with the image resolution can be presented on the display with little-to-no scaling (e.g., resizing of the image by shrinking the image, stretching the image, cropping the image, re-centering the image, and/or the like), letterboxing (e.g., presenting the image with black horizontal bars above and/or below the image), and/or pillarboxing (e.g. presenting the image with black vertical bars to the left and/or the right of the image). In some implementations, the set of optimal resolutions may include each image resolution that fits the display of the user device. In some implementations, the user device may select, based on the first information, the first image resolution from the set of optimal image resolutions.

In some implementations, a first threshold image resolution may be the minimum resolution necessary for capturing the first image of the first side of the document with enough detail for processing by the user device, a server device, and/or the like. In some implementations, the user device may determine the first threshold image resolution based on the first information. For example, the user device may use a lookup table to determine a first threshold image resolution for a front side of an employee identification card. In some implementations, the user device may determine a first threshold image resolution based on the plurality of edges, the text, the bar code, the QR code, the identification string, and/or the like that are associated with the first side of the document and that were detected by the user device when detecting the first side of the document. In some implementations, the user device may select the first image resolution, such that the first image resolution satisfies the first threshold image resolution (e.g., the first image resolution has a resolution that is higher than or equal to the first threshold image resolution). In some implementations, the user device may determine, based on the screen aspect ratio, a set of image resolutions of the plurality of image resolutions that fit the display of the user device. In some implementations, the user device may select the first image resolution from the set of image resolutions, wherein the first image resolution satisfies the first threshold image resolution (e.g., the first image resolution has a resolution that is higher than or equal to the first threshold image resolution).

In some implementations, the user device may utilize a machine learning or artificial intelligence model to select the first image resolution. For example, based on the model, the user device may assign a respective weight to the plurality of image resolutions, the first information (e.g., the information regarding content of the first side of the document, the information regarding identification of the first side of the document, the lighting information concerning the first side of the document, and/or the like), the screen aspect ratio, camera settings of the camera (e.g., shutter speed of the camera, a camera mode (e.g., quick capture mode or full capture mode), an aperture setting of the camera, an international standards organization (ISO) setting of the camera, a focus setting (e.g., autofocus) of the camera, a distance of the camera from the first side of the document, and/or the like), and/or the like to select the first image resolution. In this way, the user device may select the first image resolution in a manner that optimizes the processing resources of the user device.

In some implementations, the user device may train the model based on an artificial intelligence approach, such as a machine learning algorithm, a neural network algorithm, or another type of artificial intelligence approach. To train the model based on the artificial intelligence approach, the user device may use a training set of known inputs (e.g., inputs concerning a plurality of image resolutions, first information, a screen aspect ratio, camera settings, and/or the like) and known outputs corresponding to the inputs (e.g., outputs concerning a first image resolution). For example, the user device may train the model based on a training set of data that includes an input group (e.g., past inputs relating to a plurality of image resolutions, first information, a screen aspect ratio, camera settings, and/or the like) and an output group (e.g., past outputs relating to a first image resolution), where each input group corresponds to an optimal output group, such as an optimal first image resolution. In some implementations, another device, such as the server device, may train the model and provide the model for use by the user device.

In some implementations, the artificial intelligence approach may identify relationships between the known inputs and the known outputs, and may configure parameters corresponding to the relationships. For example, the model may process the training set of data and create general rules for selecting the first image resolution based on the plurality of image resolutions, the first information, the screen aspect ratio, the camera settings, and/or the like. In some implementations, the model may be used to generate a score that indicates a likelihood that a first image resolution is optimal.

In some implementations, the user device may update the model based on the artificial intelligence approach. For example, the user device may use a testing set of known inputs (e.g., inputs concerning a plurality of image resolutions, first information, a screen aspect ratio, camera settings, and/or the like) and target outputs corresponding to the known outputs (e.g., outputs concerning a first image resolution). The target outputs may be outputs that are known to be optimal. The user device may input, to the model, the known inputs of the testing set, and the model may output observed outputs. The user device may compare the target outputs and the observed outputs, and may reconfigure the parameters of the model based on the artificial intelligence algorithm. In this way, the user device may improve accuracy of the model based on iteratively improving accuracy of parameters of the model. In some implementations, another device, such as the server device, may update the model and provide the model for use by the user device.

In some implementations, the user device may use the trained and updated model to select the first image resolution. For example, the user device may specify a plurality of image resolutions, first information, a screen aspect ratio, camera settings, and/or the like. The model may then output information identifying a first image resolution selection, possibly with a corresponding score that indicates a likelihood that the first image resolution is optimal.

In this way, the user device may deliver an optimized process for selecting a first image resolution in a manner that conserves computing resources (e.g., processor resources, memory resources, and/or the like), which would otherwise be wasted performing an inefficient and/or time consuming process.

As shown by reference number 112, the user device (e.g., via an application executing on the user device) may display the first preview images of the first side of the document. In some implementations, the user device may cause the display of the user device to present the first preview images of the first side of the document. For example, the user device may cause the display to present the first preview images as they are captured (e.g., in real-time or substantially real-time) by the camera of the user device, which may make it appear that the preview images are streaming on the display. In some implementations, the user device may display the first preview images to assist the user in capturing the first image of the first side of the document with the camera. For example, the display of the user device can display the first preview images so that the user knows whether the user needs to take an action, such as moving the camera closer to or farther away from the first side of the document, before the user device captures the first image.

As shown by reference number 114, the user device (e.g., via an application executing on the user device) may capture the first image of the first side of the document with the camera according to the first image resolution. In some implementations, the user device may automatically capture the first image when the first side of the document is in the field of view of the camera. In some implementations, the user device may capture the first image upon the user inputting a command into the user device to capture the first image. In some implementations, the user device may cause the first image to be displayed on the display of the user device after capturing the first image.

Figure 1C:
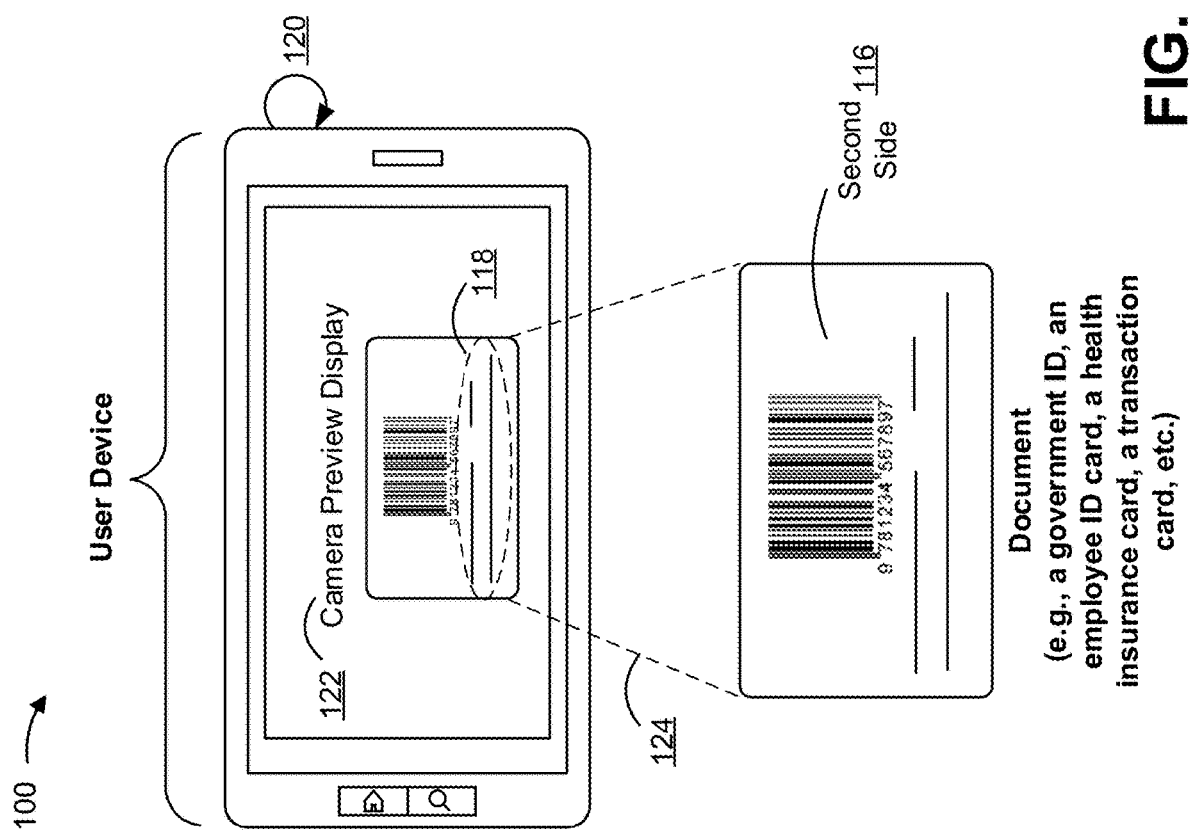

As shown in FIG. 1C, the user device may detect a second side of a document, determine second information, select a second image resolution, display second preview images, and/or capture a second image of the second side of the document according to the second image resolution in a similar manner as described herein in relation to FIG. 1B. In some implementations, as shown by reference number 116, the user device (e.g., via an application executing on the user device) may detect the second side of the document in the field of view of the camera. In some implementations, the camera may capture second preview images of the second side of the document and process the second preview images to detect the second side of the document. As with the first preview images, in some implementations, the user device may capture the second preview images using the quick capture mode.

In some implementations, the user device may employ one or more computer vision techniques to process the second preview images to detect the second side of the document and/or features of the second side of the document. In some implementations, the user device may detect a plurality of edges, text, a bar code, a quick response (QR) code, an identification string, and/or the like in a second preview image that may be associated with the second side of the document. For example, the user device may detect, in the second preview image, a bar code on the back side of a health insurance card.

As shown by reference number 118, the user device (e.g., via an application executing on the user device) may determine second information associated with the second side of the document in a similar manner as described herein in relation to FIG. 1B. In some implementations, the second information may include information regarding content of the second side of the document, information regarding identification of the second side of the document, lighting information concerning the first side of the document, and/or the like. In some implementations, the user may enter the second information into the user device through a user interface of the user device. In some implementations, the user device may determine the second information based on detecting the second side of the document. In some implementations, the user device may process the plurality of edges, the text, the bar code, the QR code, the identification string, and/or the like that may be associated with the second side of the document and that were detected by the user device when detecting the second side of the document to determine the second information. In some implementations, the user device may determine the second information by comparing information regarding the second side of the document that the user enters into the user device (e.g., input data) and information regarding the second side of the document that the user device determines based on detecting the second side of the document (e.g., image data).

As shown by reference number 120, the user device (e.g., via an application executing on the user device) may select a second image resolution for capturing a second image of the second side of the document in a similar manner as described herein in relation to FIG. 1B. In some implementations, the user device may select the second image resolution from the plurality of image resolutions based on the second information. In some implementations, the second image resolution may be different from the first image resolution. In some implementations, the second image resolution may correspond to a different quality of image than the first image resolution. In some implementations, the second image resolution may be a different level of resolution than the first image resolution. In some implementations, the second image resolution may be the same level of resolution as the first image resolution. In some implementations, the second image resolution is an optimal resolution, which provides sufficient detail to process and/or validate an image of the second side of the document while minimizing the size of the image file.

In some implementations, the user device may use a lookup table to select the second image resolution. For example, the user device may search the lookup table based on the second information to select the second image resolution. In a similar manner as described above, in some implementations, the lookup table may include a preferred image resolution for a first side of a document type and a second preferred image resolution for a second side of the document type.

In some implementations, the user device may select the second image resolution based on the second information and the screen aspect ratio. In some implementations, the user device may determine, based on the screen aspect ratio, a set of optimal image resolutions of the plurality of image resolutions that correspond to dimensions of the display of the user device. In some implementations, the user device may select, based on the second information, the second image resolution from the set of optimal image resolutions.

In some implementations, a second threshold image resolution may be the minimum resolution necessary for capturing the second image of the second side of the document with enough detail for processing by the server device. In some implementations, the user device may determine the second threshold image resolution based on the second information. For example, the user device may use a lookup table to determine a second threshold image resolution for a back side of a government-issued ID card. In some implementations, the user device may select the second image resolution, such that the second image resolution satisfies the second threshold image resolution (e.g., the second image resolution has a resolution that is higher than or equal to the second threshold image resolution). In some implementations, the first threshold image resolution is different than the second threshold image resolution. In some implementations, the first threshold image resolution is the same as the second threshold image resolution.

In some implementations, the user device may determine, based on the screen aspect ratio, a set of image resolutions of the plurality of image resolutions that fit the display of the user device. In some implementations, in a similar manner as described above, the user device may select the second image resolution from the set of image resolutions, wherein the second image resolution satisfies the second threshold image resolution (e.g., the second image resolution has a resolution that is higher than or equal to the second threshold image resolution). In some implementations, the first threshold image resolution is associated with the quick capture mode of the camera and the second threshold image resolution is associated with the full capture mode of the camera, the first threshold image resolution is associated with the full capture mode of the camera and the second threshold image resolution is associated with the quick capture mode of the camera, the first threshold image resolution and the second threshold image resolution are each, respectively, associated with the quick capture mode of the camera, or the first threshold image resolution and the second threshold image resolution are each, respectively, associated with the full capture mode of the camera.

In some implementations, in a similar manner as described herein in relation to FIG. 1B, the user device may utilize a machine learning or artificial intelligence model to select the second image resolution. For example, based on the model, the user device may assign a respective weight to the plurality of image resolutions, the second information (e.g., the information regarding content of the second side of the document, the information regarding identification of the second side of the document, the lighting information concerning the second side of the document, and/or the like), the screen aspect ratio, camera settings of the camera (e.g., shutter speed of the camera, a camera mode (e.g., quick capture mode or full capture mode), an aperture setting of the camera, an ISO setting of the camera, a focus setting (e.g., autofocus) of the camera, a distance of the camera from the second side of the document, and/or the like), and/or the like to select the second image resolution. In this way, the user device may select the first image resolution in a manner that optimizes the processing resources of the user device.

In some implementations, the user device may train and update the model based on an artificial intelligence approach, such as a machine learning algorithm, a neural network algorithm, or another type of artificial intelligence approach. In some implementations, another device, such as the server device, may train, update, and provide the model for use by the user device. In some implementations, the user device may use the trained and updated model to select the second image resolution. For example, the user device may specify a plurality of image resolutions, second information, a screen aspect ratio, camera settings, and/or the like. The model may then output information identifying a second image resolution selection, possibly with a corresponding score that indicates a likelihood that the second image resolution is optimal.

In this way, the user device may deliver an optimized process for selecting a second image resolution in a manner that conserves computing resources (e.g., processor resources, memory resources, and/or the like), which would otherwise be wasted performing an inefficient and/or time consuming process.

As shown by reference number 122, the user device (e.g., via an application executing on the user device) may display the second preview images of the second side of the document in a similar manner as described herein in relation to FIG. 1B. In some implementations, the user device may cause the display of the user device to present the second preview images of the second side of the document. In some implementations, the user device may display the second preview images to assist the user in capturing the second image of the second side of the document with the camera.

As shown by reference number 124, the user device (e.g., via an application executing on the user device) may capture the second image of the second side of the document with the camera according to the second image resolution in a similar manner as described herein in relation to FIG. 1B. In some implementations, the user device may automatically capture the second image when the second side of the document is in the field of view of the camera. In some implementations, the user device may capture the second image upon the user inputting a command into the user device to capture the second image. In some implementations, the user device may cause the second image to be displayed on the display of the user device after capturing the second image.

Figure 1D:
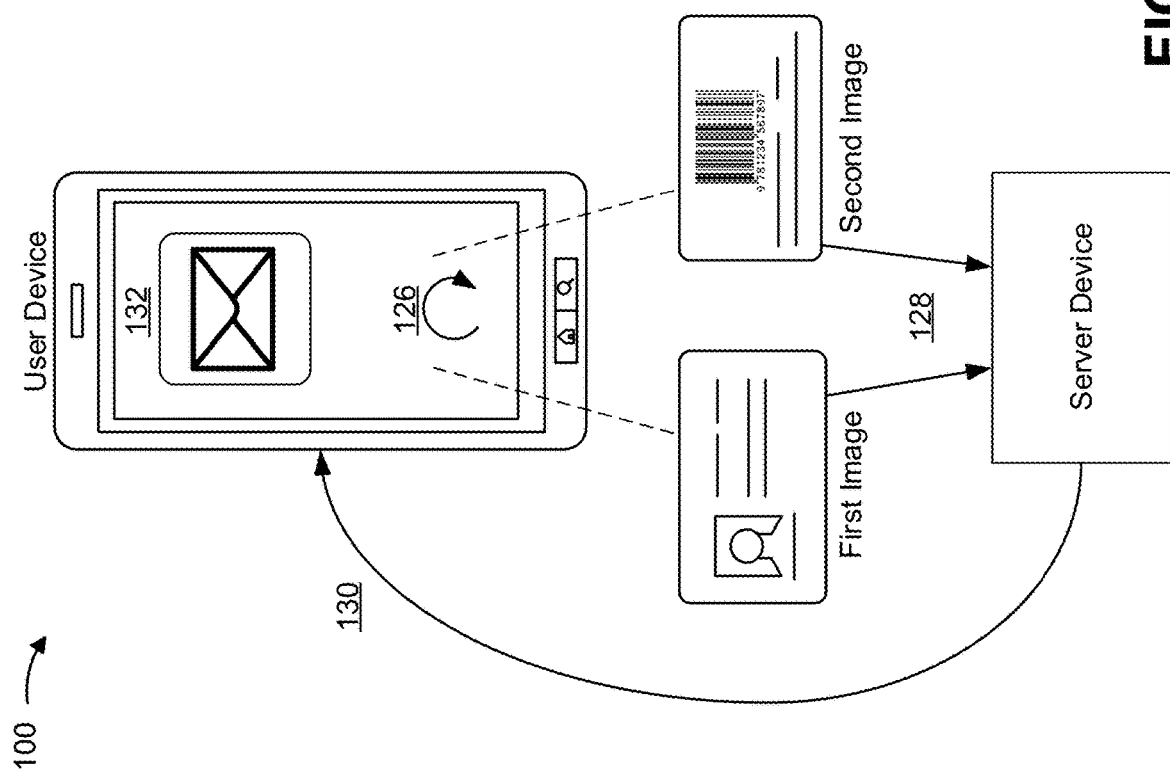

As shown in FIG. 1D, the user device may perform an action related to the first image and the second image. As shown by reference number 126, the user device (e.g., via an application executing on the user device) may process the first image and the second image. In some implementations, the user device may validate the first image and the second image. In some implementations, validating the first image and the second image comprises determining that first data can be extracted from the first image and that second data can be extracted from the second image. For example, the user device may use a computer vision technique to process the first image to determine that the first image has features consistent with a first side of a document as opposed to a random image. Similarly, the user device may use the computer vision technique to process the second image to determine that the second image has features consistent with a second side of a document as opposed to a random image.

In some implementations, the user device may perform optical character recognition (OCR) on the first image and the second image to generate third information and validate the document based on the first information, the second information, and the third information. For example, the first information may include information regarding content of the front side of a government-issued ID card that was input by a user via the user device and the second information may include information identifying the back side of the government-issued ID card that was determined based on detecting the second side of the document. The user device may perform OCR on the first image and the second image to generate third information, which may include information regarding content of text viewable on the front side of the government-issued ID card and content of an identification string on the back side of the government-issued ID card. The user device may determine that the document is valid if the first information, the second information, and the third information are consistent.

In some implementations, the user device may crop the first image to include first image data concerning only the first side of the document and crop the second image to include second image data concerning only the second side of the document. In this way, the user device can remove unnecessary image data and reduce the file size of the first image and the file size of the second image.

In some implementations, the user device may identify a document type of the document based on the first image and the second image. For example, the user device may process the first image and the second image using a computer vision technique to determine that the first image and the second image are consistent with a health insurance card. In some implementations, the user device may cause a message indicating the document type to be displayed on the display of the user device.

As shown by reference number 128, the user device (e.g., via an application executing on the user device) may send the first image and the second image to a server device. As shown by reference number 130, the server device may process the first image and the second image. For example, the server device may use a computer vision technique to extract the first data from the first image and the second data from the second image. The server device may verify that the first data and the second data is accurate by comparing the first data, the second data, and third data from a database that includes document-related information. In some implementations, the server device may send a message to the user device based on processing the first image and the second image. For example, the server device may send a message to the user device indicating that the first data associated with the first image and the second data associated with the second image are accurate. In some implementations, the server device may send information concerning the document, such as accuracy of the document, to the user device.

As shown by reference number 132, the user device (e.g., via an application executing on the user device) may receive the message and display the message on the display of the user device. In some implementations, the user device may receive the information concerning the document and present a message indicating the information concerning the document for display on a display of the user device.

In this way, the user device optimizes image capture for multiple subjects (e.g., a first side of a document and a second side of a document). In this way, the user device ensures that that first image resolution for capturing the first image is a high enough resolution for the user device and/or a server to process the first image, and that the second image resolution for capturing the second image is a high enough resolution for the user device and/or the server to process the second image. Moreover, the first image resolution and the second image resolution are chosen based on the document and/or subject so as to limit computing resources needed to capture, upload, and process the first and second image. For example, by optimally choosing image resolutions on a document/subject basis, the user device minimizes the file size of the first image and the file size of the second image, which shortens the amount of time to capture, upload, and process the first image and the second image. This conserves computing resources, power resources, and memory resources of the user device that would otherwise need to be expended in cases where images are captured with a default resolution. In addition, this conserves computing resources, memory resources, and network resources, associated with a backend platform, such as a server, that would otherwise need to be expended to receive and process images with a large file size.

As indicated above, FIGS. 1A-1D are provided merely as examples. Other examples are possible and may differ from what was described with regard to FIGS. 1A-1D.

Figure 2:
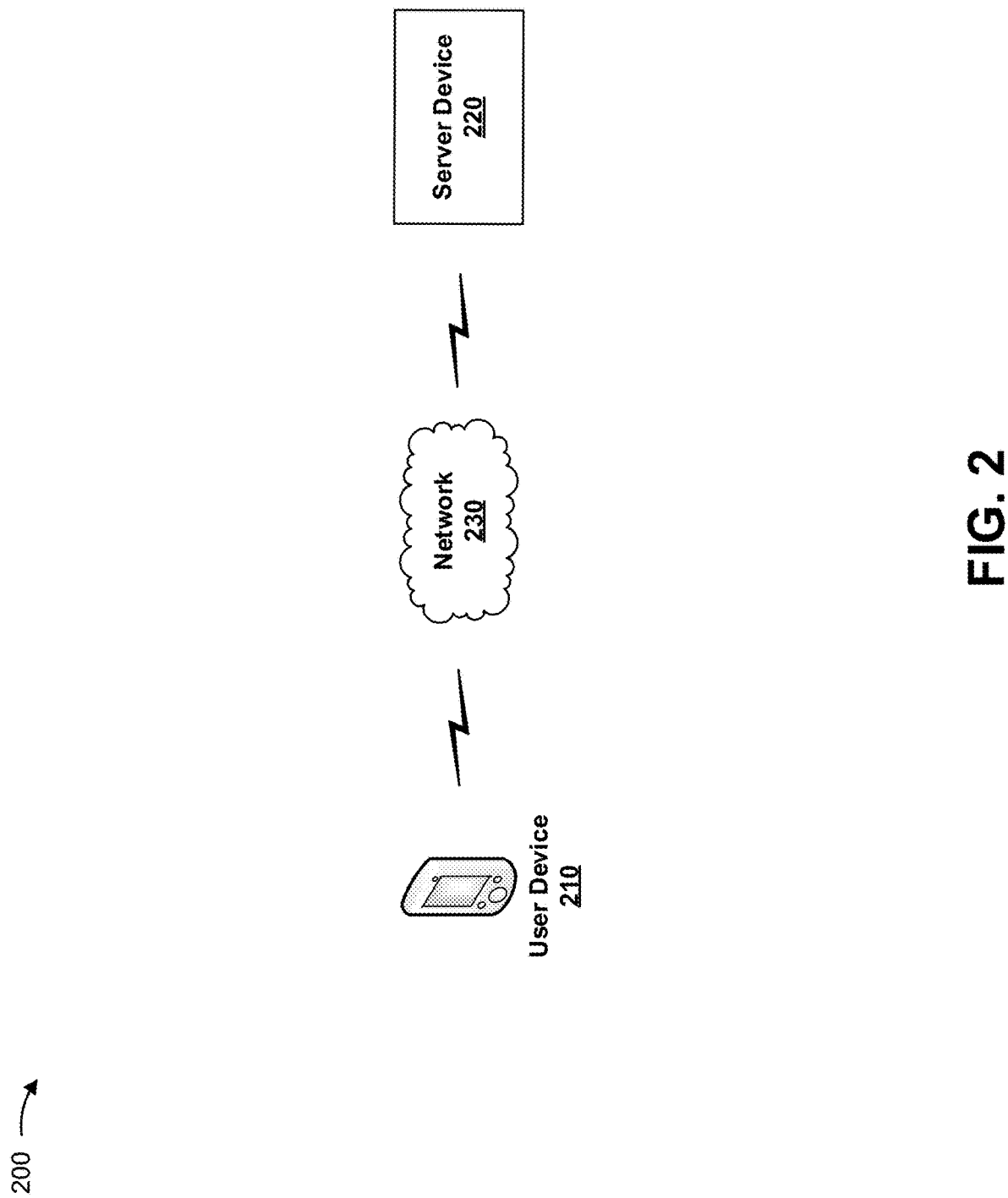
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of receiving, generating, storing, processing, and/or providing information associated with dynamically optimizing photo capture for multiple subjects. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include a camera, and may capture an image (e.g., of a document) using the camera. In some implementations, user device 210 may send the captured image, via network 230, to server device 220 for processing the captured image. In some implementations, user device 210 may receive a message from server device 220 and may display the message.

Server device 220 includes one or more devices capable of receiving, generating, storing, processing, and/or providing information associated with dynamically optimizing photo capture for multiple subjects. For example, server device 220 may include a server device (e.g., a host server, a web server, an application server, etc.), a data center device, or a similar device, capable of communicating with user device 210 via network 230. In some implementations, server device 220 may receive, from user device 210, an image captured by user device 210, and may process the image. In some implementations, server device 220 may send, to user device 210 via network 230, a message based on processing an image.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
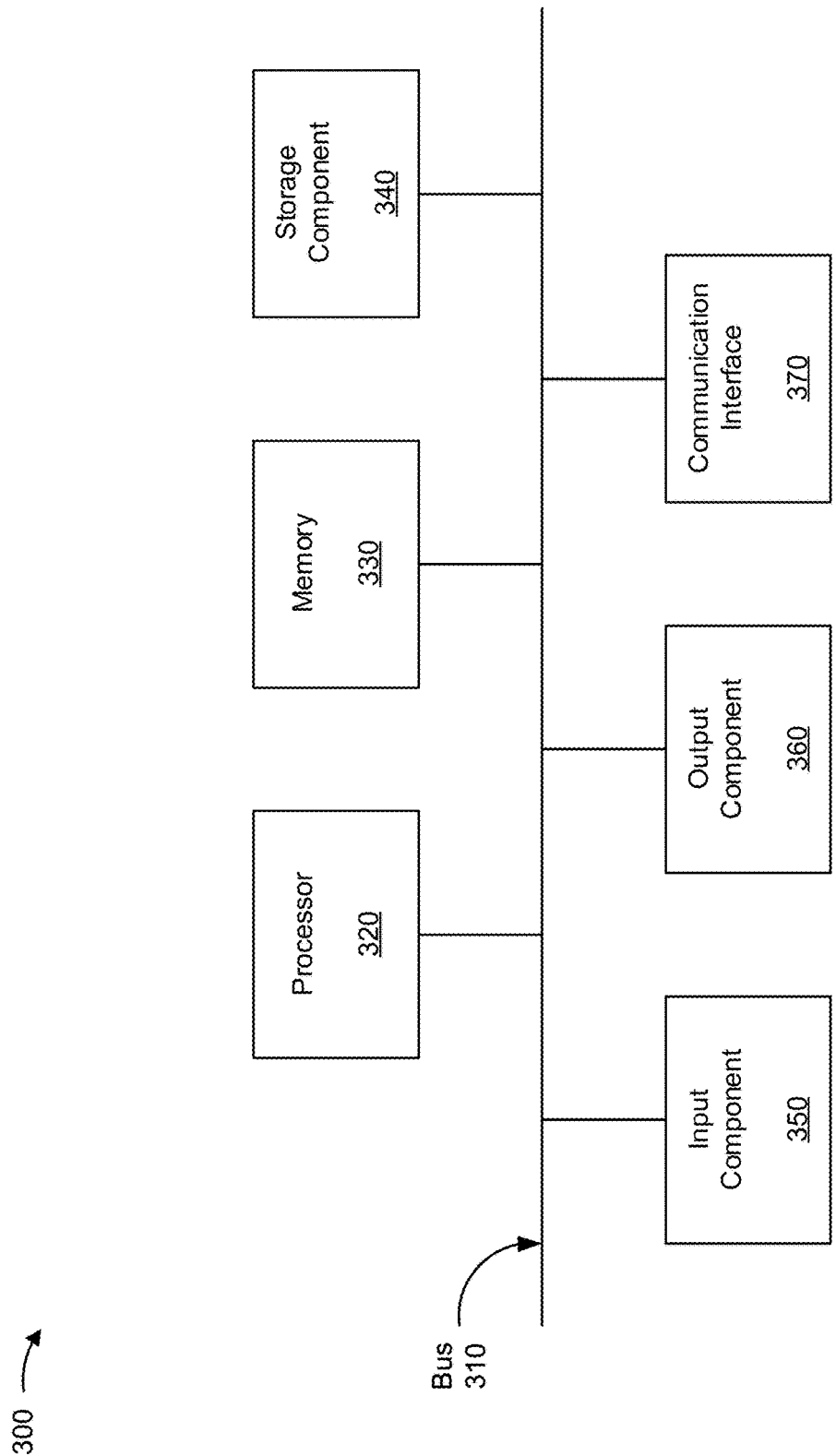
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
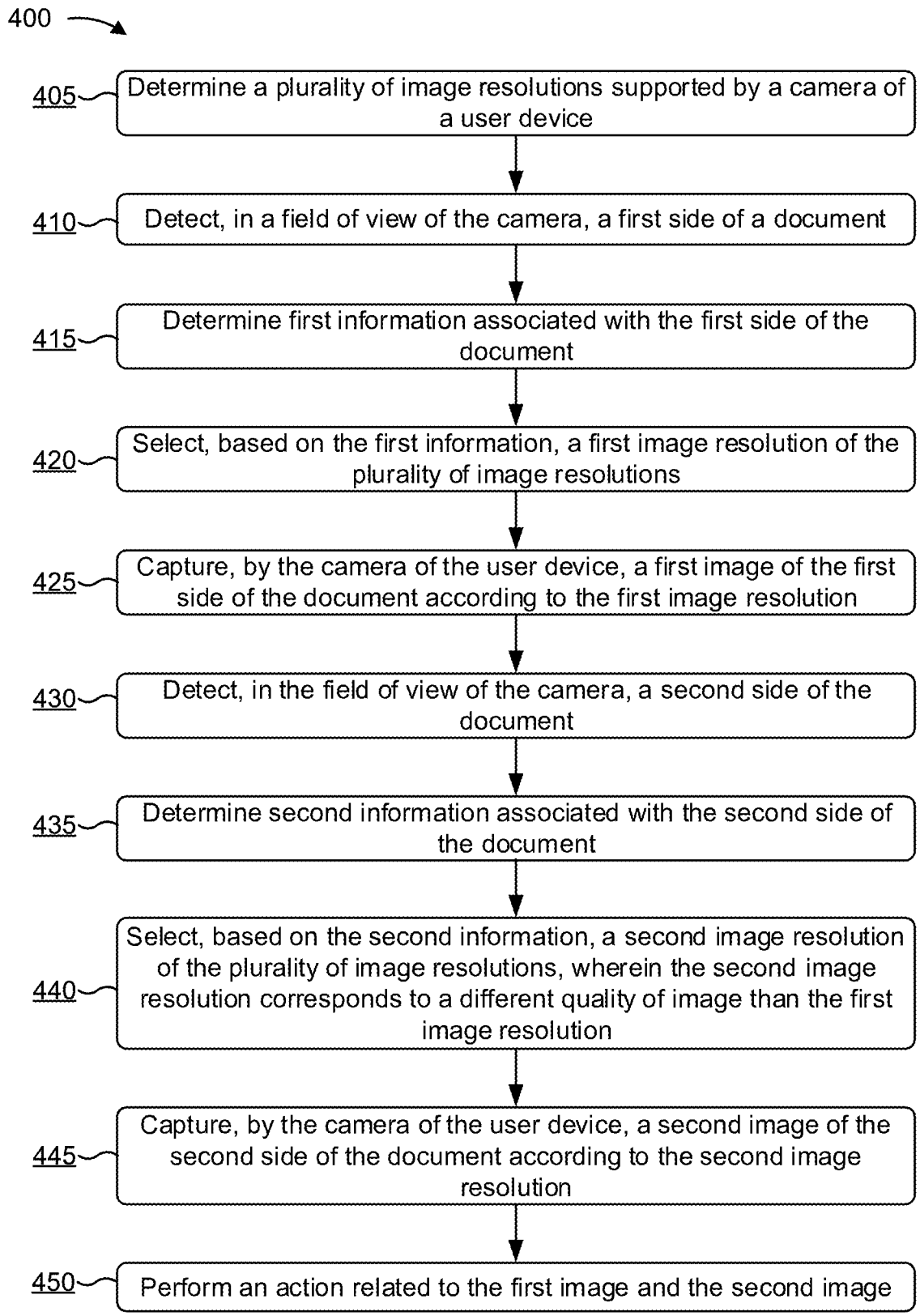
FIG. 4 is a flow chart of an example process for dynamically optimizing photo capture for multiple subjects.

FIG. 4 is a flow chart of an example process 400 for dynamically optimizing photo capture for multiple subjects. In some implementations, one or more process blocks of FIG. 4 may be performed by a user device (e.g., user device 210). In some implementations, one or more process blocks of FIG. 4 may be performed by another device or a group of devices separate from or including the user device, such as a server device (e.g., server device 220).

As shown in FIG. 4, process 400 may include determining a plurality of image resolutions supported by a camera of the user device (block 405). For example, the user device (e.g., using processor 320, memory 330, storage component 340, and/or the like) may determine a plurality of image resolutions supported by a camera of the user device, as described above in connection with FIGS. 1A-1D.

As further shown in FIG. 4, process 400 may include detecting, in a field of view of the camera, a first side of a document (block 410). For example, the user device (e.g., using processor 320, memory 330, storage component 340, input component 350, communication interface 370, and/or the like) may detect, in a field of view of the camera, a first side of a document, as described above in connection with FIGS. 1A-1D.

As further shown in FIG. 4, process 400 may include determining first information associated with the first side of the document (block 415). For example, the user device (e.g., using processor 320, memory 330, storage component 340, and/or the like) may determine first information associated with the first side of the document, as described above in connection with FIGS. 1A-1D.

As further shown in FIG. 4, process 400 may include selecting, based on the first information, a first image resolution of the plurality of image resolutions (block 420). For example, the user device (e.g., using processor 320, memory 330, storage component 340, and/or the like) may select, based on the first information, a first image resolution of the plurality of image resolutions, as described above in connection with FIGS. 1A-1D.

As further shown in FIG. 4, process 400 may include capturing, by the camera of the user device, a first image of the first side of the document according to the first image resolution (block 425). For example, the user device (e.g., using processor 320, memory 330, storage component 340, input component 350, communication interface 370, and/or the like) may capture, by the camera of the user device, a first image of the first side of the document according to the first image resolution, as described above in connection with FIGS. 1A-1D.

As further shown in FIG. 4, process 400 may include detecting, in the field of view of the camera, a second side of the document (block 430). For example, the user device (e.g., using processor 320, memory 330, storage component 340, input component 350, communication interface 370, and/or the like) may detect, in the field of view of the camera, a second side of the document, as described above in connection with FIGS. 1A-1D.

As further shown in FIG. 4, process 400 may include determining second information associated with the second side of the document (block 435). For example, the user device (e.g., using processor 320, memory 330, storage component 340, and/or the like) may determine second information associated with the second side of the document, as described above in connection with FIGS. 1A-1D.

As further shown in FIG. 4, process 400 may include selecting, based on the second information, a second image resolution of the plurality of image resolutions, wherein the second image resolution corresponds to a different quality of image than the first image resolution (block 440). For example, the user device (e.g., using processor 320, memory 330, storage component 340, and/or the like) may select, based on the second information, a second image resolution of the plurality of image resolutions, as described above in connection with FIGS. 1A-1D. In some implementations, the second image resolution may correspond to a different quality of image than the first image resolution.

As further shown in FIG. 4, process 400 may include capturing, by the camera of the user device, a second image of the second side of the document according to the second image resolution (block 445). For example, the user device (e.g., using processor 320, memory 330, storage component 340, input component 350, communication interface 370, and/or the like) may capture, by the camera of the user device, a second image of the second side of the document according to the second image resolution, as described above in connection with FIGS. 1A-1D.

As further shown in FIG. 4, process 400 may include performing an action related to the first image and the second image (block 450). For example, the user device (e.g., using processor 320, memory 330, storage component 340, input component 350, output component 360, communication interface 370, and/or the like) may perform an action related to the first image and the second image, as described above in connection with FIGS. 1A-1D.

Process 400 may include additional implementations, such as any single implementation or any combination of implementations described below and/or in connection with one or more other processes described elsewhere herein.

In some implementations, when determining the first information associated with the first side of the document, the user device may determine the first information associated with the first side of the document based on a first identification string that is visible on the first side of the document. In some implementations, when determining the second information associated with the second side of the document, the user device may determine the second information associated with the second side of the document based on a quick response (QR) code, bar code, or second identification string that is visible on the second side of the document.

In some implementations, when detecting, in the field of view of the camera, the first side of the document, the user device may detect a plurality of edges associated with the first side of the document, and may detect text associated with the first side of the document. In some implementations, when detecting, in the field of view of the camera, the second side of the document, the user device may detect a plurality of edges associated with the second side of the document, may detect a bar code associated with the second side of the document, and may detect text associated with the second side of the document. In some implementations, the first image resolution may be associated with a quick capture mode of the camera, and the second image resolution may be associated with a full capture mode of the camera.

In some implementations, when performing the action related to the first image and the second image, the user device may validate the first image and the second image, may send the first image and the second image to a remote device, may receive, based on sending the first image and the second image to the remote device, third information concerning the document, and may present, for display on a display of the user device, a message indicating the third information. In some implementations, when validating the first image and the second image, the user device may determine that first data can be extracted from the first image, and may determine that second data can be extracted from the second image.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
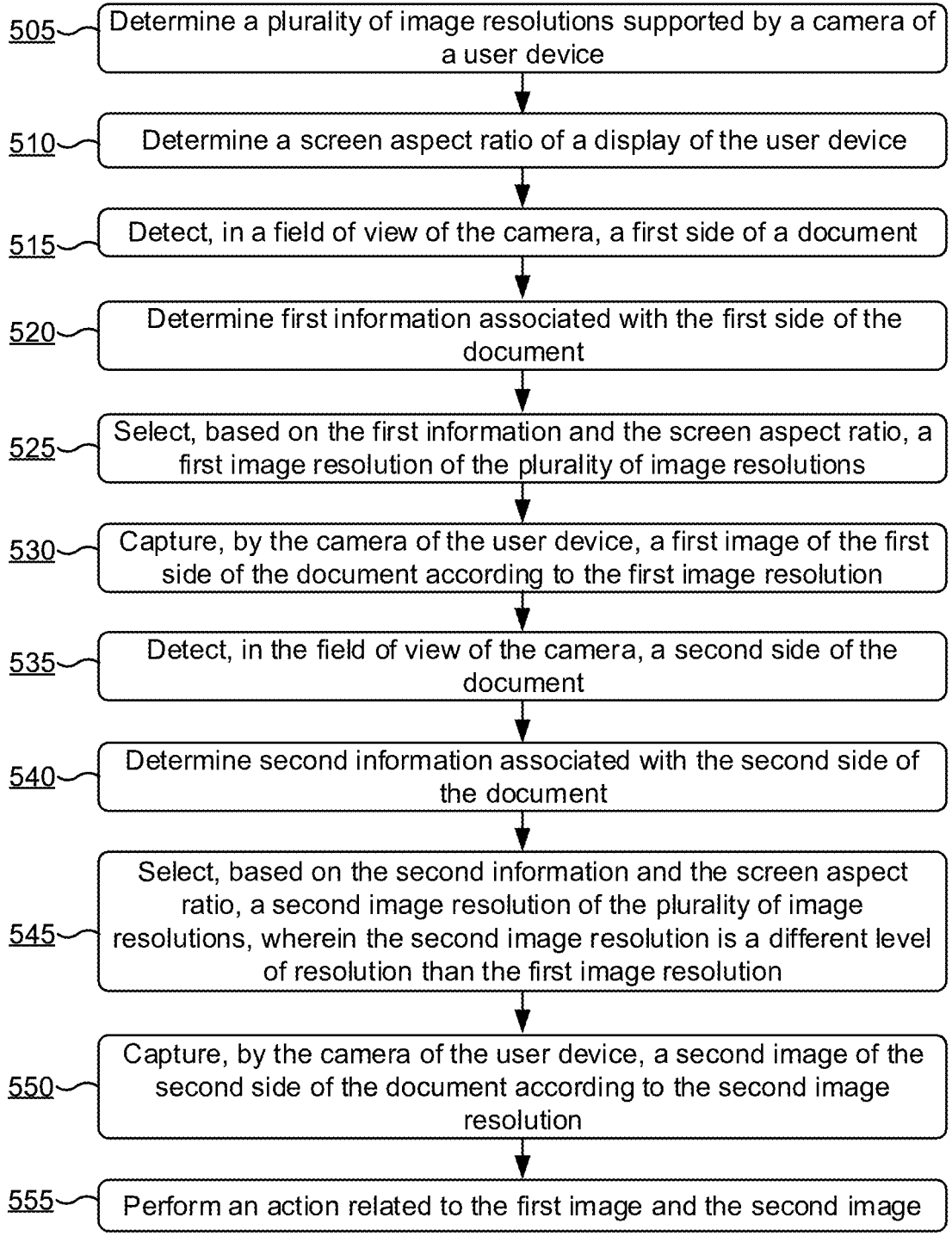
FIG. 5 is a flow chart of an example process for dynamically optimizing photo capture for multiple subjects.

FIG. 5 is a flow chart of an example process 500 for dynamically optimizing photo capture for multiple subjects.

In some implementations, one or more process blocks of FIG. 5 may be performed by a user device (e.g., user device 210). In some implementations, one or more process blocks of FIG. 5 may be performed by another device or a group of devices separate from or including the user device, such as a server device (e.g., server device 220).

As shown in FIG. 5, process 500 may include determining a plurality of image resolutions supported by a camera of the user device (block 505). For example, the user device (e.g., using processor 320, memory 330, storage component 340, and/or the like) may determine a plurality of image resolutions supported by a camera of the user device, as described above in connection with FIGS. 1A-1D.

As further shown in FIG. 5, process 500 may include determining a screen aspect ratio of a display of the user device (block 510). For example, the user device (e.g., using processor 320, memory 330, storage component 340, and/or the like) may determine a screen aspect ratio of a display of the user device, as described above in connection with FIGS. 1A-1D.

As further shown in FIG. 5, process 500 may include detecting, in a field of view of the camera, a first side of a document (block 515). For example, the user device (e.g., using processor 320, memory 330, storage component 340, input component 350, communication interface 370, and/or the like) may detect, in a field of view of the camera, a first side of a document, as described above in connection with FIGS. 1A-1D.

As further shown in FIG. 5, process 500 may include determining first information associated with the first side of the document (block 520). For example, the user device (e.g., using processor 320, memory 330, storage component 340, and/or the like) may determine first information associated with the first side of the document, as described above in connection with FIGS. 1A-1D.

As further shown in FIG. 5, process 500 may include selecting, based on the first information and the screen aspect ratio, a first image resolution of the plurality of image resolutions (block 525). For example, the user device (e.g., using processor 320, memory 330, storage component 340, and/or the like) may select, based on the first information and the screen aspect ratio, a first image resolution of the plurality of image resolutions, as described above in connection with FIGS. 1A-1D.

As further shown in FIG. 5, process 500 may include capturing, by the camera of the user device, a first image of the first side of the document according to the first image resolution (block 530). For example, the user device (e.g., using processor 320, memory 330, storage component 340, input component 350, communication interface 370, and/or the like) may capture, by the camera of the user device, a first image of the first side of the document according to the first image resolution, as described above in connection with FIGS. 1A-1D.

As further shown in FIG. 5, process 500 may include detecting, in the field of view of the camera, a second side of the document (block 535). For example, the user device (e.g., using processor 320, memory 330, storage component 340, input component 350, communication interface 370, and/or the like) may detect, in the field of view of the camera, a second side of the document, as described above in connection with FIGS. 1A-1D.

As further shown in FIG. 5, process 500 may include determining second information associated with the second side of the document (block 540). For example, the user device (e.g., using processor 320, memory 330, storage component 340, and/or the like) may determine second information associated with the second side of the document, as described above in connection with FIGS. 1A-1D.

As further shown in FIG. 5, process 500 may include selecting, based on the second information and the screen aspect ratio, a second image resolution of the plurality of image resolutions, wherein the second image resolution is a different level of resolution than the first image resolution (block 545). For example, the user device (e.g., using processor 320, memory 330, storage component 340, and/or the like) may select, based on the second information and the screen aspect ratio, a second image resolution of the plurality of image resolutions, as described above in connection with FIGS. 1A-1D. In some implementations, the second image resolution may be a different level of resolution than the first image resolution.

As further shown in FIG. 5, process 500 may include capturing, by the camera of the user device, a second image of the second side of the document according to the second image resolution (block 550). For example, the user device (e.g., using processor 320, memory 330, storage component 340, input component 350, communication interface 370, and/or the like) may capture, by the camera of the user device, a second image of the second side of the document according to the second image resolution, as described above in connection with FIGS. 1A-1D.

As further shown in FIG. 5, process 500 may include performing an action related to the first image and the second image (block 555). For example, the user device (e.g., using processor 320, memory 330, storage component 340, input component 350, output component 360, communication interface 370, and/or the like) may perform an action related to the first image and the second image, as described above in connection with FIGS. 1A-1D.

Process 500 may include additional implementations, such as any single implementation or any combination of implementations described below and/or in connection with one or more other processes described elsewhere herein.

In some implementations, when selecting, based on the first information and the screen aspect ratio, the first image resolution of the plurality of image resolutions, the user device may determine, based on the screen aspect ratio, a set of optimal image resolutions of the plurality of image resolutions that correspond to dimensions of the display of the user device, and may select, based on the first information, the first image resolution from the set of optimal image resolutions.

In some implementations, when selecting, based on the second information and the screen aspect ratio, the second image resolution of the plurality of image resolutions, the user device may determine a threshold image resolution based on the second information, may determine, based on the screen aspect ratio, a set of image resolutions of the plurality of image resolutions that fit the display of the user device, and may select the second image resolution from the set of image resolutions, where the second image resolution satisfies the threshold image resolution.

In some implementations, when determining the first information associated with the first side of the document, the user device may receive input data from a user, via the user device, regarding the first side of the document, may determine, based on detecting the first side of the document, image data concerning the first side of the document, and may determine the first information associated with the first side of the document by comparing the input data and the image data.

In some implementations, when performing the action related to the first image and the second image, the user device may crop the first image to include first image data concerning only the first side of the document, and may crop the second image to include second image data concerning only the second side of the document. In some implementations, the user device may cause the first image to be displayed on the display of the user device after capturing the first image, and may cause the second image to be displayed on the display of the user device after capturing the second image.

In some implementations, when performing the action related to the first image and the second image, the user device may identify a document type of the document based on the first image and the second image, and may cause a message indicating the document type to be displayed on the display of the user device. In some implementations, when performing the action related to the first image and the second image, the user device may perform optical character recognition on the first image and the second image to generate third information, and may validate the document based on the first information, the second information, and the third information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
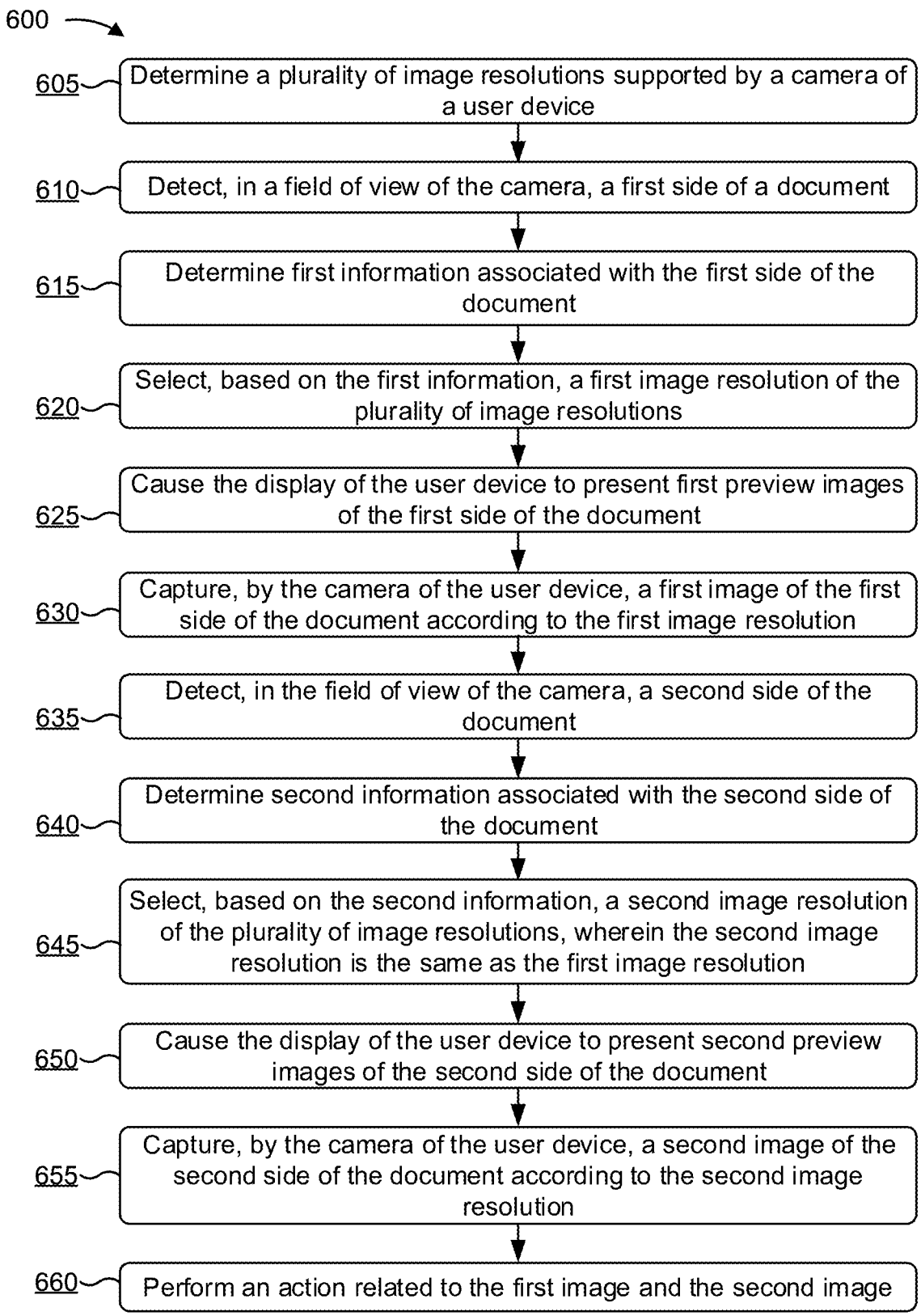
FIG. 6 is a flow chart of an example process for dynamically optimizing photo capture for multiple subjects.

FIG. 6 is a flow chart of an example process 600 for dynamically optimizing photo capture for multiple subjects. In some implementations, one or more process blocks of FIG. 6 may be performed by a user device (e.g., user device 210). In some implementations, one or more process blocks of FIG. 6 may be performed by another device or a group of devices separate from or including the user device, such as a server device (e.g., server device 220).

As shown in FIG. 6, process 600 may include determining a plurality of image resolutions supported by a camera of the user device (block 605). For example, the user device (e.g., using processor 320, memory 330, storage component 340, and/or the like) may determine a plurality of image resolutions supported by a camera of the user device, as described above in connection with FIGS. 1A-1D.

As shown in FIG. 6, process 600 may include detecting, in a field of view of the camera, a first side of a document (block 610). For example, the user device (e.g., using processor 320, memory 330, storage component 340, input component 350, communication interface 370, and/or the like) may detect, in a field of view of the camera, a first side of a document, as described above in connection with FIGS. 1A-1D.

As shown in FIG. 6, process 600 may include determining first information associated with the first side of the document (block 615). For example, the user device (e.g., using processor 320, memory 330, storage component 340, and/or the like) may determine first information associated with the first side of the document, as described above in connection with FIGS. 1A-1D.

As shown in FIG. 6, process 600 may include selecting, based on the first information, a first image resolution of the plurality of image resolutions (block 620). For example, the user device (e.g., using processor 320, memory 330, storage component 340, and/or the like) may select, based on the first information, a first image resolution of the plurality of image resolutions, as described above in connection with FIGS. 1A-1D.

As shown in FIG. 6, process 600 may include causing the display of the user device to present first preview images of the first side of the document (block 625). For example, the user device (e.g., using processor 320, memory 330, storage component 340, output component 360, communication interface 370, and/or the like) may cause the display of the user device to present first preview images of the first side of the document, as described above in connection with FIGS. 1A-1D.

As shown in FIG. 6, process 600 may include capturing, by the camera of the user device, a first image of the first side of the document according to the first image resolution (block 630). For example, the user device (e.g., using processor 320, memory 330, storage component 340, input component 350, communication interface 370, and/or the like) may capture, by the camera of the user device, a first image of the first side of the document according to the first image resolution, as described above in connection with FIGS. 1A-1D.

As shown in FIG. 6, process 600 may include detecting, in the field of view of the camera, a second side of the document (block 635). For example, the user device (e.g., using processor 320, memory 330, storage component 340, input component 350, communication interface 370, and/or the like) may detect, in the field of view of the camera, a second side of the document, as described above in connection with FIGS. 1A-1D.

As shown in FIG. 6, process 600 may include determining second information associated with the second side of the document (block 640). For example, the user device (e.g., using processor 320, memory 330, storage component 340, and/or the like) may determine second information associated with the second side of the document, as described above in connection with FIGS. 1A-1D.

As shown in FIG. 6, process 600 may include selecting, based on the second information, a second image resolution of the plurality of image resolutions, wherein the second image resolution is the same as the first image resolution (block 645). For example, the user device (e.g., using processor 320, memory 330, storage component 340, and/or the like) may select, based on the second information, a second image resolution of the plurality of image resolutions, as described above in connection with FIGS. 1A-1D. In some implementations, the second image resolution may be the same as the first image resolution.

As shown in FIG. 6, process 600 may include causing the display of the user device to present second preview images of the second side of the document (block 650). For example, the user device (e.g., using processor 320, memory 330, storage component 340, output component 360, communication interface 370, and/or the like) may cause the display of the user device to present second preview images of the second side of the document, as described above in connection with FIGS. 1A-1D.

As shown in FIG. 6, process 600 may include capturing, by the camera of the user device, a second image of the second side of the document according to the second image resolution (block 655). For example, the user device (e.g., using processor 320, memory 330, storage component 340, input component 350, communication interface 370, and/or the like) may capture, by the camera of the user device, a second image of the second side of the document according to the second image resolution, as described above in connection with FIGS. 1A-1D.

As shown in FIG. 6, process 600 may include performing an action related to the first image and the second image (block 660). For example, the user device (e.g., using processor 320, memory 330, storage component 340, input component 350, output component 360, communication interface 370, and/or the like) may perform an action related to the first image and the second image, as described above in connection with FIGS. 1A-1D.

Process 600 may include additional implementations, such as any single implementation or any combination of implementations described below and/or in connection with one or more other processes described elsewhere herein.

In some implementations, the document may include a government-issued identification card, an employee identification card, a health insurance card, or a transaction card. In some implementations, when selecting, based on the first information, the first image resolution of the plurality of image resolutions, the user device may determine a first threshold image resolution based on the first information, and may select the first image resolution, where the first image resolution satisfies the first threshold image resolution. In some implementations, when selecting, based on the second information, the second image resolution of the plurality of image resolutions, the user device may determine a second threshold image resolution based on the second information, and may select the second image resolution, where the second image resolution satisfies the second threshold image resolution.

In some implementations, the first threshold image resolution may be different than the second threshold image resolution. In some implementations, the first threshold image resolution may be associated with a quick capture mode of the camera and the second threshold image resolution is associated with a full capture mode of the camera.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, provide a user device 210 that is able to automatically select an optimal image resolution for capturing an image of a side of a document such that the image resolution is a high enough resolution to meet certain image quality standards and the image resolution is a low enough resolution to minimize image file size. In some implementations, user device 210 may detect a first side of a document in a field of view of a camera of user device 210 and determine first information associated with the first side of the document. In some implementations, user device 210 may select a first image resolution, based on the first information, for capturing a first image of the first side of the document and capture the first image according to the first image resolution. In some implementations, user device 210 may detect a second side of a document in the field of view of the camera of user device 210 and determine second information associated with the second side of the document. In some implementations, user device 210 may select a second image resolution, based on the second information, for capturing a second image of the second side of the document and capture the second image according to the second image resolution. In some implementations, the first image resolution may be different than the second image resolution.

In this way, user device 210 optimizes image capture for multiple subjects (e.g., a first side of a document and a second side of a document). In this way, user device 210 ensures that that first image resolution for capturing the first image is a high enough resolution for user device 210 and/or server device 220 to process the first image and the second image resolution for capturing the second image is a high enough resolution for user device 210 and/or server device 220 to process the second image. Moreover, user device 210 ensures that the first image resolution is not higher than the first image resolution needs to be for processing of the first image, and ensures that the second image resolution is not higher than the second resolution needs to be for processing the second image, which minimizes the file size of the first image and the file size of the second image. This shortens the amount of time to capture, upload, and process the first image and the second image, which conserves computing resources, power resources, and memory resources of user device 210 that would otherwise need to be expended in cases where images are captured with a default resolution. In addition, this conserves computing resources, memory resources, and network resources, associated with a backend platform, such as a server device 220, that would otherwise need to be expended to receive and process images with a large file size.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   capturing, by a camera of a user device, a first image of a first side of a document according to a first image resolution;
   determining, by the user device, second information associated with a second side of the document;
   determining, by the user device, a threshold image resolution based on the second information;
   determining, by the user device, a set of image resolutions of a plurality of image resolutions;
   selecting, by the user device and based on the second information, a second image resolution from the set of image resolutions,
      wherein the second image resolution corresponds to a different quality of image than the first image resolution, and
      wherein the second image resolution satisfies the threshold image resolution;
   capturing, by the camera of the user device, a second image of the second side of the document according to the second image resolution; and
   performing, by the user device, an action related to the first image and the second image.

2. The method of claim 1, further comprising:
   determining first information associated with the first side of the document; and
   selecting, from the plurality of image resolutions and based on the first information, the first image resolution.

3. The method of claim 1, wherein selecting the second image resolution comprises:
   selecting the second image resolution based on a lookup table,
      the lookup table including:
         data associating the first image resolution with the first side of the document, and
         data associating the second image resolution with the second side of the document.

4. The method of claim 1, further comprising:
   detecting the first side of the document using at least one preview image of the first side of the document; and
   wherein determining the second information comprises:
      determining the second information based on detecting the first side of the document.

5. The method of claim 4, wherein detecting the first side of the document comprises:

detecting the first side of the document using one or more computer vision techniques to process the at least one preview image of the first side of the document.

6. The method of claim 4, wherein detecting the first side of the document comprises:
   identifying, based on the at least one preview image, one or more features of the first side of the document; and
   detecting the first side of the document based on the one or more features.

7. The method of claim 1, wherein the document comprises:
   a government-issued identification card,
   an employee identification card,
   a health insurance card,
   a transaction card, or
   a check.

8. A device, comprising:
   one or more memories; and
   one or more processors communicatively coupled to the one or more memories, configured to:
      capture a first image of a first side of a document according to a first image resolution;
      determine second information associated with a second side of the document;
      determine a threshold image resolution based on the second information;
      determine a set of image resolutions of a plurality of image resolutions;
      select, based on the second information, a second image resolution from the set of image resolutions, wherein the second image resolution corresponds to a different quality of image than the first image resolution, and
         wherein the second image resolution satisfies the threshold image resolution;
      capture a second image of the second side of the document according to the second image resolution; and
      perform an action related to the first image and the second image.

9. The device of claim 8, wherein the one or more processors are further configured to:
   determine first information associated with the first side of the document; and
   select, from the plurality of image resolutions and based on the first information, the first image resolution.

10. The device of claim 8, wherein the one or more processors, when selecting the second image resolution, are configured to:
    select the second image resolution based on a lookup table,
       the lookup table including:
          data associating the first image resolution with the first side of the document, and
          data associating the second image resolution with the second side of the document.

11. The device of claim 8, wherein the one or more processors are further configured to:
    detect the first side of the document using at least one preview image of the first side of the document; and
    wherein the one or more processors, when determining the second information, are configured to:
       determine the second information based on detecting the first side of the document.

12. The device of claim 11, wherein the one or more processors, when detecting the first side of the document, are configured to:
    detect the first side of the document using one or more computer vision techniques to process the at least one preview image of the first side of the document.

13. The device of claim 11, wherein the one or more processors, when detecting the first side of the document, are configured to:
    identify, based on the at least one preview image, one or more features of the first side of the document; and
    detect the first side of the document based on the one or more features.

14. The device of claim 8, wherein the document comprises:
    a government-issued identification card,
    an employee identification card,
    a health insurance card,
    a transaction card, or
    a check.

15. A non-transitory computer-readable medium storing instructions, the instructions comprising:
    one or more instructions that, when executed by one or more processors, cause the one or more processors to:
       capture a first image of a first side of a document according to a first image resolution;
       determine second information associated with a second side of the document;
       determine a threshold image resolution based on the second information;
       determine a set of image resolutions of a plurality of image resolutions;
       select, based on the second information, a second image resolution from the set of image resolutions, wherein the second image resolution corresponds to a different quality of image than the first image resolution, and
          wherein the second image resolution satisfies the threshold image resolution;
       capture a second image of the second side of the document according to the second image resolution; and
       perform an action related to the first image and the second image.

16. The non-transitory computer-readable medium of claim 15, wherein the one or more instructions, when executed by the one or more processors, further cause the one or more processors to:
    determine first information associated with the first side of the document; and
    select, from the plurality of image resolutions and based on the first information, the first image resolution.

17. The non-transitory computer-readable medium of claim 15, wherein the one or more instructions, that cause the one or more processors to select the second image resolution, cause the one or more processors to:
    select the second image resolution based on a lookup table,
       the lookup table including:
          data associating the first image resolution with the first side of the document, and
          data associating the second image resolution with the second side of the document.

18. The non-transitory computer-readable medium of claim 15, wherein the one or more instructions, when executed by the one or more processors, further cause the one or more processors to:
    detect the first side of the document using at least one preview image of the first side of the document; and wherein the one or more instructions, that cause the one or more processors to determine the second information, cause the one or more processors to:
  determine the second information based on detecting the first side of the document.

19. The non-transitory computer-readable medium of claim 18, wherein the one or more instructions, that cause the one or more processors to detect the first side of the document, cause the one or more processors to:
  detect the first side of the document using one or more computer vision techniques to process the at least one preview image of the first side of the document.

20. The non-transitory computer-readable medium of claim 18, wherein the one or more instructions, that cause the one or more processors to detect the first side of the document, cause the one or more processors to:
  identify, based on the at least one preview image, one or more features of the first side of the document; and
  detect the first side of the document based on the one or more features.

* * * * *